May 14, 1968   J. C. F. WHICKER   3,382,731
SCREW AND NUT MECHANISMS
Filed May 20, 1966
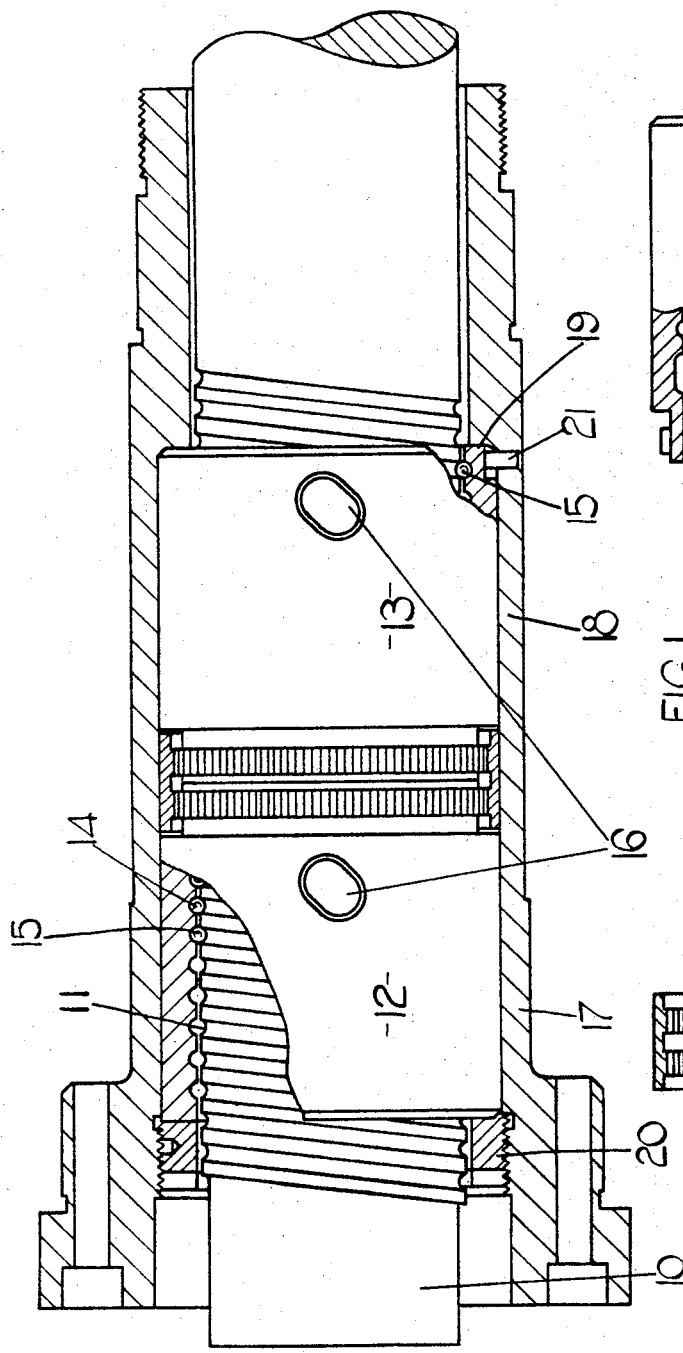
FIG.1.
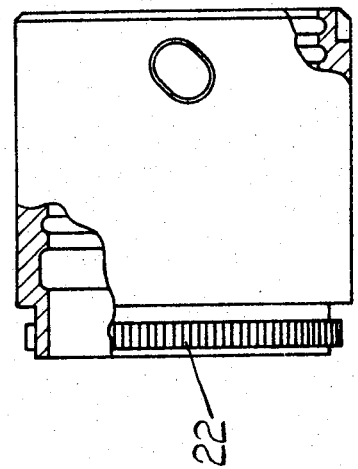
FIG.3.
FIG.2.

United States Patent Office 3,382,731
Patented May 14, 1968

3,382,731
SCREW AND NUT MECHANISMS
John Charles Frederick Whicker, Tring, England, assignor to Rotax Limited, London, England
Filed May 20, 1966, Ser. No. 551,654
Claims priority, application Great Britain, May 31, 1965, 23,031/65
4 Claims. (Cl. 74—424.8)

ABSTRACT OF THE DISCLOSURE

A screw and nut mechanism comprising a pair of nuts mounted within a housing and engaging a threaded shaft which extends through the housing. The nuts having presented faces which are urged into engagement by a screwed ring engaged within the housing, the relative angular setting of the nuts being determined by a sleeve having two series of gear teeth which are engaged with complementary series of teeth on the nuts respectively one series of teeth having more teeth than the other series of teeth whereby the backlash between the shaft and the housing can be adjusted.

---

This invention relates to screw and nut mechanisms of the kind comprising a shaft having a screw thread formed on its periphery and a nut carrying thread engaging means mounted on the shaft.

With such mechanisms it is difficult to machine the thread and thread engaging means to an accuracy such, that when the two parts are assembled together, there will be a specific amount of backlash therebetween. Backlash in this context means the amount of relative axial movement which can take place between the nut and shaft without relative angular movement therebetween. It has therefore been the practice to adjust the backlash after assembly of the screw and nut and the object of this invention is to provide a mechanism of the kind specified in which this can be achieved in a simple and convenient manner.

According to the invention a screw and nut mechanism of the kind specified comprises a second nut mounted on the shaft, said nuts being arranged to be held against relative axial movement, and coupling means interconnecting the nuts whereby the relative angular setting of the nuts can be adjusted.

In the accompanying drawings:

FIGURE 1 is a part-sectional side elevation of one example of a screw and nut mechanism in accordance with the invention, FIGURE 2 is a sectional side elevation of one part of the mechanism shown in FIGURE 1, and FIGURE 3 is a part sectional view of another part of the mechanism shown in FIGURE 1.

Referring to the drawings there is provided a rotary shaft 10 having a helical semi-circular groove 11 formed thereon. Surrounding the shaft are a pair of nuts 12, 13 having helical semi-circular grooves 14 formed on their internal peripheries respectively, the pitch and hand of these grooves being identical with the groove 11. Associated with the nuts respectively are two sets of balls 15, and these are arranged to lie within the grooves of the associated nut and the shaft, and the arrangement is such that when the shaft 10 is rotated and the nuts are held against angular movement axial movement will be imparted to the nuts. Each nut is provided with one or more transfer passages 16 so that the balls can recirculate in known manner in the grooves.

The nuts 12, 13 are provided with a cylindrical peripheral surface and are mounted within a housing 17 having a stepped bore 18 formed therein. The end of the nut 13 is located against a step 19 in the bore and the remote end of the nut 12 is engaged by a lock-ring 20 which is in screw thread engagement with the housing. The lock-ring 20 is adjusted in use, so that the presented ends of the two nuts engage each other, and a pin 21 is provided in the housing for preventing rotation of the nut 13 relative to the housing.

As shown in FIGURE 3 the presented ends of the two nuts are of reduced diameter and formed on the nuts respectively are two series of gear teeth 22. Also provided is a sleeve like coupling 23 which is formed with two series of teeth 24 on its internal periphery for engagement with the series of teeth on the two nuts to prevent relative angular movement therebetween. The number of teeth on one nut is different from that on the other nut and in one example one nut was provided with 90 teeth whilst the other nut was provided with 91 teeth.

When it is required to adjust the backlash the nuts 12, 13 must be moved angularly relative to each other. In order to do this the lock-ring 20 is first removed from the housing and the shaft 10 rotated until a plain portion thereof is wholly located within the nut 12. This nut is then moved axially to disengage the teeth thereon from the coupling 23 and it can then be moved angularly and the teeth re-engaged and the mechanism re-assembled. If the adjustment effected in this manner is too large so that the presented faces of the nuts cannot be moved into contact with each other the mechanism must be adjusted by movement of the coupling sleeve 23 relative to both the nuts or vice-versa and in this way the adjustment which is obtained is much smaller owing to the difference in the number of teeth on the nuts.

It should be noted that the diameter of the plain portion of the shaft should be approximately equal to the root diameter of the groove otherwise there is a risk that the balls 15 associated with the nut 12 would become dislodged. If the diameter of the plain portion is too small a plain cylindrical sleeve not shown may be utilised to engage over said portion of the shaft whilst the nut 12 is moved axially.

In an alternative construction the teeth on the coupling are provided on the external periphery thereof, and the coupling is accommodated within recesses formed in the nuts. For engagement with the teeth of the coupling pegs are provided on the nuts respectively and the method of adjustment is substantially as described in the first example.

Having thus described my invention what I claim as new and desire to secure by Letters Patent is:

1. A screw and nut mechanism comprising in combination, a tubular housing, a step defined on the internal periphery of the housing, a first nut located within said housing and engaging the step therein, means for preventing angular movement of said first nut relative to the housing, a second nut located within the housing, retaining means engaging the housing and said second nut for retaining the first and second nuts in fixed axial relationship to each other, a pair of reduced cylindrical portions respectively on the faces of the nuts which are presented to each other, two series of axially extending teeth formed about the periphery of said portions respectively, a sleeve like member having complimentary series of teeth formed on the internal periphery thereof for engagement with said portions, the number of teeth in one series being different from that in the other series, a shaft passing through said nuts, a screw thread formed on said shaft and screw thread engaging means carried by said nuts for engagement with the screw thread of said shaft whereby by releasing said retaining means the nuts may be moved axially relative to each other to disengage said teeth and then moved angularly relative to each other to adjust the back lash between the shaft and housing, prior to re-engagement of the teeth and locking of the retaining means.

2. A screw and nut mechanism as set forth in claim 1 in which said retaining means comprises a peripherally threaded ring engageable within a complementarily threaded portion of the housing, said ring engaging said second nut to urge the presented faces of said portions into contact with each other thereby to maintain said nuts in fixed axial relationship.

3. A screw and nut mechanism as set forth in claim 2 in which said means comprises a pin located within a bore in the housing and engaged with said first nut to prevent angular movement thereof.

4. A screw and nut mechanism as set forth in claim 3 in which said screw thread engaging means comprises two series of balls carried by said nuts respectively.

References Cited

UNITED STATES PATENTS

| | | | |
|---|---|---|---|
| 2,124,852 | 7/1938 | Graves et al. | 74—441 X |
| 2,734,394 | 2/1956 | Chauvel | 74—441 |
| 2,905,008 | 9/1959 | Sears | 74—409 |
| 2,978,920 | 4/1961 | Sears et al. | 74—441 |
| 3,059,494 | 10/1962 | Grabowski et al. | 74—441 |
| 3,141,349 | 7/1964 | McDonald | 74—441 |

FRED C. MATTERN, Jr., *Primary Examiner.*

LEONARD H. GERIN, *Examiner.*